(12) United States Patent
Lawrence

(10) Patent No.: US 7,739,977 B1
(45) Date of Patent: Jun. 22, 2010

(54) VEHICLE VISUAL INDICATOR

(76) Inventor: Peter Lawrence, 116 Clarke Rd., Hope, RI (US) 02831

( * ) Notice: Subject to any disclaimer, the term of this patent is extended or adjusted under 35 U.S.C. 154(b) by 104 days.

(21) Appl. No.: 12/141,272

(22) Filed: Jun. 18, 2008

Related U.S. Application Data

(60) Provisional application No. 60/936,271, filed on Jun. 19, 2007.

(51) Int. Cl.
*B60Q 1/30* (2006.01)
(52) U.S. Cl. ....................... 116/30; 116/28 R
(58) Field of Classification Search ............... 116/28 R, 116/30, 33, 35 R, 42, 43, 44, 45, 46, 47, 51, 116/52, 85, 86, 100, 209; 280/762
See application file for complete search history.

(56) References Cited

U.S. PATENT DOCUMENTS

| | | | | |
|---|---|---|---|---|
| 877,385 | A * | 1/1908 | Thompson | 116/30 |
| 1,303,754 | A * | 5/1919 | Anson et al. | 116/52 |
| 2,060,483 | A * | 11/1936 | Bamberger | 116/51 |
| 3,924,558 | A * | 12/1975 | Di Grazia | 116/28 R |
| 4,068,769 | A * | 1/1978 | Sweet et al. | 116/28 R |
| 4,586,454 | A * | 5/1986 | Hedquist et al. | 116/28 R |
| 5,602,526 | A * | 2/1997 | Read | 116/28 R |
| 6,069,753 | A * | 5/2000 | Sheets | 116/30 |
| 6,374,766 | B1 * | 4/2002 | Clark | 116/28 R |
| 6,727,806 | B1 * | 4/2004 | Massie et al. | 116/28 R |
| 7,059,690 | B1 * | 6/2006 | Pinkston | 116/51 |
| 7,128,019 | B2 | 10/2006 | Hensel | |
| 2006/0042538 | A1 * | 3/2006 | Schumacher et al. | 116/28 R |
| 2007/0266927 | A1 * | 11/2007 | Peguero | 116/28 R |

* cited by examiner

*Primary Examiner*—R. A. Smith
(74) *Attorney, Agent, or Firm*—Salter & Michaelson

(57) ABSTRACT

A visual indicator device for use on a vehicle that includes a bed and a tailgate that engages with the bed and that may assume open and closed positions relative to the bed. The visual indicator device is for determining, from the cab of the vehicle via a rearview mirror, the status of the position of the tailgate. The visual indicator device includes a support mechanism including a first mechanism mounted to the bed and a second mechanism mounted to the tailgate, an actuation pin mechanism that intercouples the first and second mechanisms, and an indicator flag supported by the first mechanism and responsive to the position of the actuation pin mechanism so that the indicator flag has an indicating position when the tailgate is disengaged from the bed so that the actuation pin mechanism is out of engagement with the indicator flag, and has a rest position when the tailgate is engages with the bed whereby the actuation pin mechanism is in engagement with the indicator flag.

23 Claims, 11 Drawing Sheets

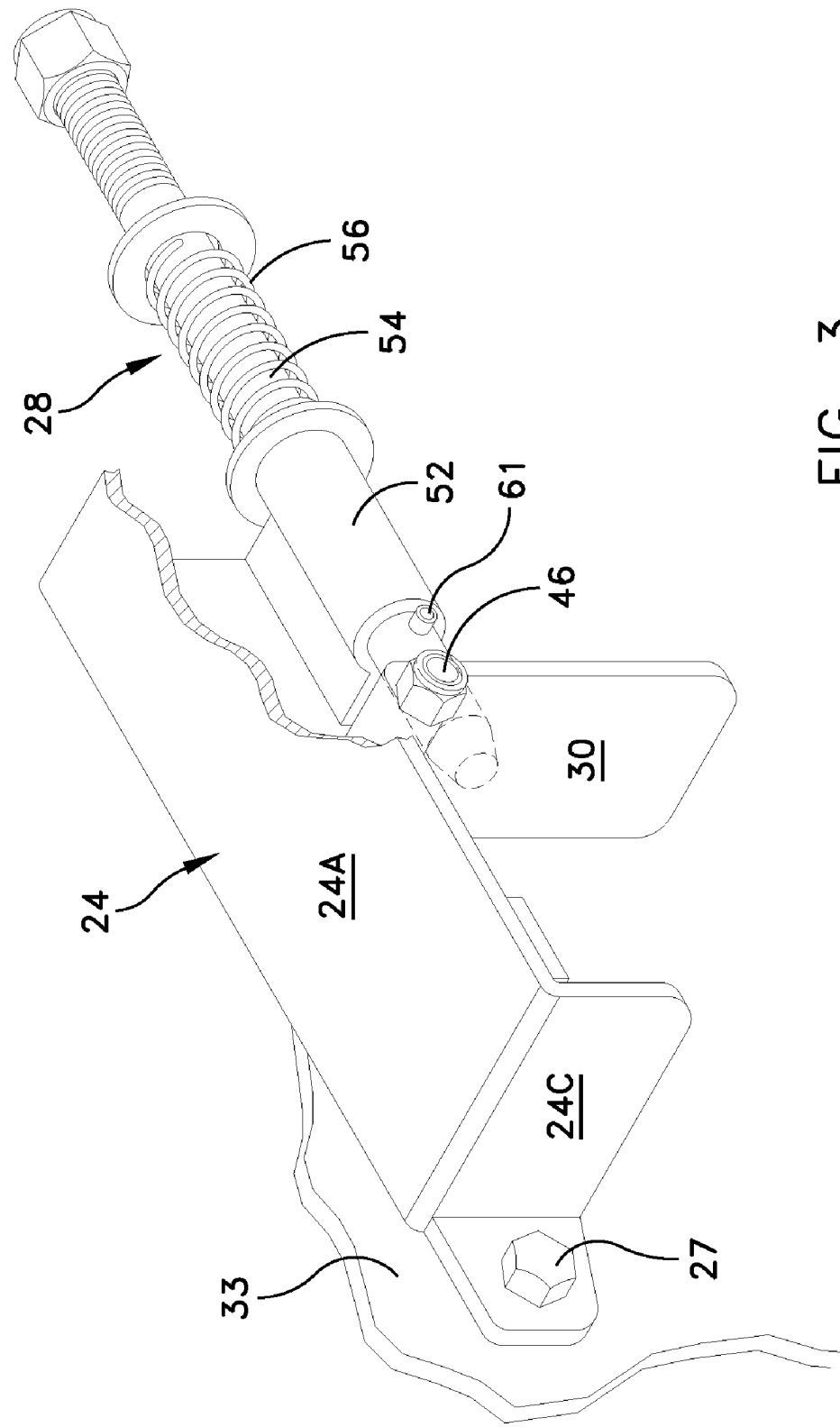

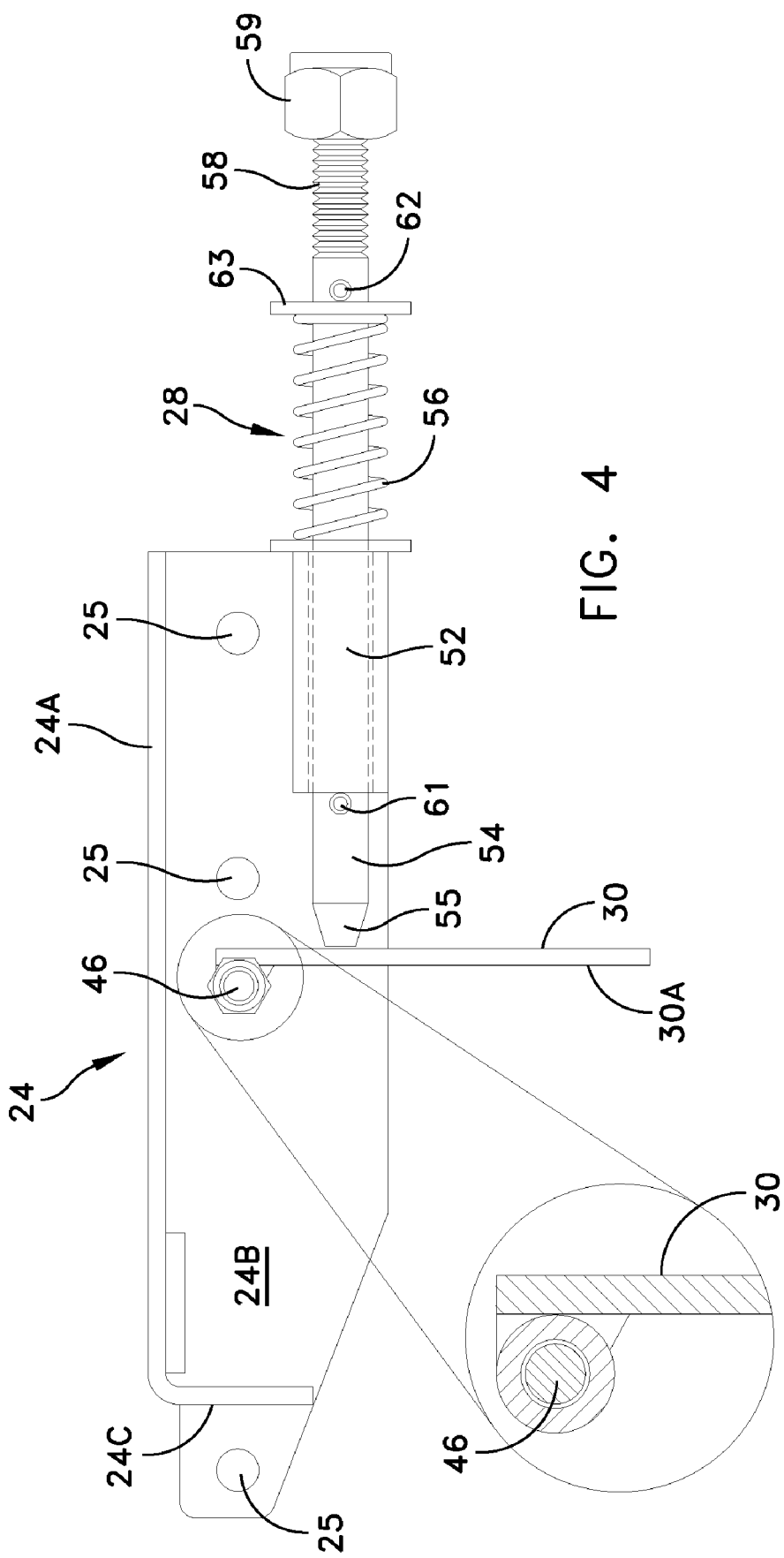

VEHICLE VISUAL INDICATOR

RELATED APPLICATION

Priority for this application is hereby claimed under 35 U.S.C. §119(e) to commonly owned and U.S. Provisional Patent Application No. 60/936,271 which was filed on Jun. 19, 2007 and which is incorporated by reference herein in its entirety.

TECHNICAL FIELD

The present invention relates in general to indicator devices and pertains, more particularly, to a visual indicator device preferably used on trucks. The visual indicator device of the present invention is meant to indicate to the driver in the cab of the vehicle whether the tailgate of the truck is properly open or closed.

BACKGROUND OF THE INVENTION

Existing trucks, particularly dump trucks and dump trailers include a rear tailgate that is pivoted from the top and may be automatically locked by the driver from the vehicle driving compartment. The locking mechanism includes a hook member that is actuated to engage a pin at the bottom of the tailgate. This hook member is operated, such as from a solenoid, which is controlled by a button or switch in the driving compartment. Even though this locking arrangement is sufficient for many purposes, there are instances in which the locking mechanism does not properly lock. This can occur, for example, if stones or other debris is caught at the bottom of the tailgate so that the locking mechanism only partially engages. This can be an unsafe condition wherein the tailgate can disengage, particularly when the truck goes over a rough road thus releasing part or all of the material being held in the truck body bed.

Accordingly, it is an object of the present invention to provide a visual indicator that can be observed through the rearview mirror at the side of the vehicle to easily tell the driver whether the tailgate is properly closed or not.

Another object of the present invention is to provide a visual indicator that is readily observed in the driving cab of the truck, that is easy to install, that is relatively inexpensive to purchase and install, and that adds a substantial safety factor to prevent unwanted release of material in the bed of the vehicle.

SUMMARY OF THE INVENTION

To accomplish the foregoing and other objects, features and advantages of the present invention, there is provided a visual indicator for a vehicle that is adapted to be mounted on the side of the body of the truck or trailer. This indicator includes a main bracket that supports both a sliding pin as well as a pivotal flag or door. The sliding pin is normally biased to an outer position and when the tailgate is open the associated pivotal door is adapted to be in a vertical viewing position. When the tailgate is properly closed, then the sliding pin slides inwardly engaging the pivotal flag or door and lifting the flag so that it is arranged inside the bracket and thus out of view. Accordingly, when the pivotal flag is out of view this is an indication that the tailgate has been completely closed. Even a slight viewing of the door or flag may be an indication that the tailgate has not been completely closed.

In accordance with one embodiment of the present invention there is provided a visual indicator device for use on a vehicle that includes a bed and a tailgate that engages with the bed and that may assume open and closed positions relative to the bed, the visual indicator device for determining, from the cab of the vehicle via a rearview mirror, the status of the position of the tailgate. The visual indicator device comprises a support mechanism including a first mechanism mounted to the bed and a second mechanism mounted to the tailgate, an actuation pin mechanism that intercouples the first and second mechanisms, and an indicator flag or door supported by the first mechanism and responsive to the position of the actuation pin mechanism so that the indicator flag has an indicating position when the tailgate is disengaged from the bed so that the actuation pin mechanism is out of engagement with the indicator flag, and has a rest position when the tailgate is engages with the bed whereby the actuation pin mechanism is in engagement with the indicator flag.

In accordance with other aspects of the present invention the first mechanism includes an angle bracket having one leg that is secured to the bed and another leg that supports the actuation pin mechanism; the second mechanism includes a bracket assembly that is secured to a side of the tailgate and that includes a contact plate that is for engagement by the actuation pin mechanism; the second mechanism further includes a flange that is attached to the side of the tailgate and a spacer that intercouples the flange and contact plate; the contact plate includes contact plate portion and a support plate portion that is orthogonal to the contact plate portion, the support plate portion being attached to an end of the spacer and pivotally supported therefrom to enable adjustment of the position thereof; the second mechanism includes a bracket assembly that is secured to a side of the tailgate and that includes a contact plate that is for engagement by the actuation pin mechanism, and the actuation pin mechanism includes a slide pin and a collar that is fixed in position at the first mechanism and slidably supports the slide pin; the action pin mechanism further includes a coil spring disposed about the slide pin and a pair of stops for limiting the extended position of the slide pin, the coil spring for biasing the slide pin away from the collar; the actuation pin mechanism includes a slide pin and a collar that is fixed in position at the first mechanism and slidably supports the slide pin; the indicator flag is pivotally supported from a leg of the first mechanism so that the indicating position thereof is substantially vertical under gravity; the actuation pin mechanism, when moved by contact with the second mechanism, moves to the rest position thereof whereby the indicator flag is substantially horizontal by contact of the actuation pin mechanism with the indicator flag; and the indicator flag has a forward facing surface with a visual fluorescent area.

In accordance with another version of the invention there is provided a visual indicator device for attachment between a truck bed and tailgate. The device includes a bed bracket; means securing the bed bracket to the bed of the truck; a tailgate bracket assembly; means securing the tailgate bracket assembly to the tailgate of the truck; an actuation pin mechanism that intercouples the first and second mechanisms; means for mounting the actuation pin mechanism to the bed bracket; and an indicator flag supported by the bed bracket and responsive to the position of a slide pin of the actuation pin mechanism so that the indicator flag has an indicating position when the tailgate is disengaged from the bed so that the actuation pin mechanism is out of engagement with the indicator flag, and has a rest position when the tailgate is engages with the bed whereby the actuation pin mechanism is in engagement with the indicator flag.

In accordance with still other aspects of the present invention the tailgate can assume an open or closed position relative to the bed, and the device is viewable from the cab of the vehicle via a rearview mirror to determine the status of the position of the tailgate relative to the bed; the indicator flag, in the open position of the tailgate, is visual via the rearview mirror, and in the closed position thereof, is out of view in its rest position via the rearview mirror; the indicator flag is supported in a pivotal manner and assumes a substantially vertical position in the open position of the tailgate, a substantially horizontal position in the closed position of the tailgate; and the actuation pin mechanism includes a slide pin, a collar that is fixed in position at the bed bracket and slidably supports the slide pin, and a biasing means that urges the slide pin away from the collar.

Also in accordance with the present invention there is provided a method of operating an indicator device that is used on a vehicle that includes a bed and a tailgate that engages with the bed and that may assume open and closed positions of the tailgate relative to the bed. The method comprises determining, from the cab of the vehicle via a rearview mirror, the status of the open or closed position of the tailgate relative to the bed, providing a visual indicator flag that is mounted at the rear of the vehicle adjacent the interface between the bed and tailgate and that can assume an indicating position or a non-indicating position, causing the visual indicator device to move to the indicator position thereof when the tailgate is open, and alternatively causing the visual indicator device to move to the non-indicator position thereof when the tailgate is closed.

In accordance with further aspects of the method of the present invention the indicator flag includes a visual surface of a size sufficient for viewing from the vehicle cab in the open position of the tailgate, and in the closed position thereof, is out of view in its rest position via the rearview mirror; the indicator flag is supported in a pivotal manner and assumes a substantially vertical position in the open position of the tailgate, a substantially horizontal position in the closed position of the tailgate; and the actuation pin mechanism includes a slide pin, a collar that is fixed in position at the bed bracket and slidably supports the slide pin, and a biasing means that urges the slide pin away from the collar.

BRIEF DESCRIPTION OF THE DRAWINGS

Numerous other objects, features and advantages of the present invention will be realized upon a reading of the following detailed description taken in connection with the accompanying drawings, in which:

FIG. 3 is a partially cut-away perspective view of a part of the mechanism of the present device, particularly the part of the mechanism attached to the bed of the vehicle;

FIG. 4 is a side elevation view of the mechanism of FIG. 3 with the flag or door in its indicating position;

FIG. 5 is a fragmentary cross-sectional view illustrating the manner in which the door is supported from the bracket mechanism;

DETAILED DESCRIPTION

Figure 1:
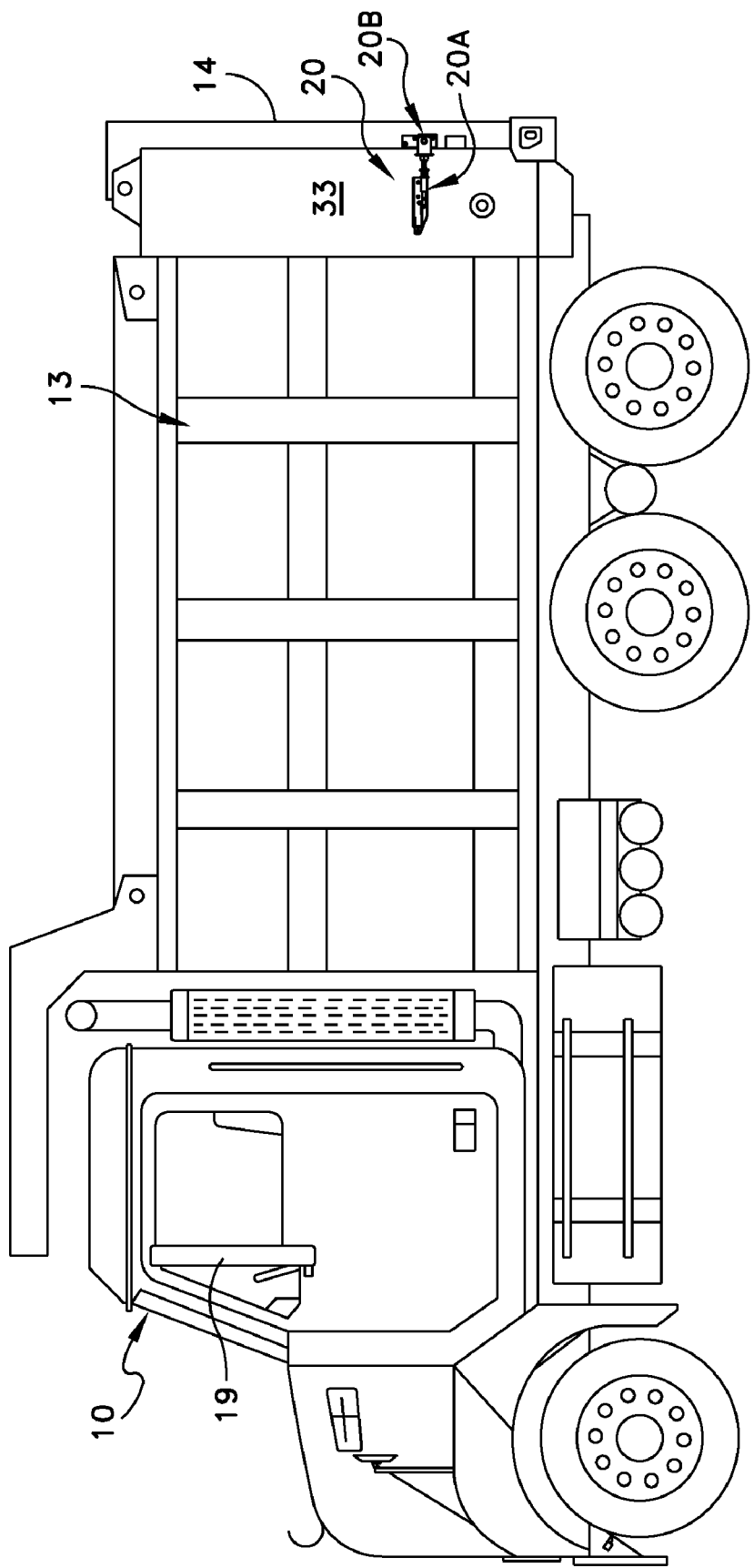
FIG. 1 is a side elevation view illustrating the indicator device of the present invention as installed on a truck.
Figure 10:
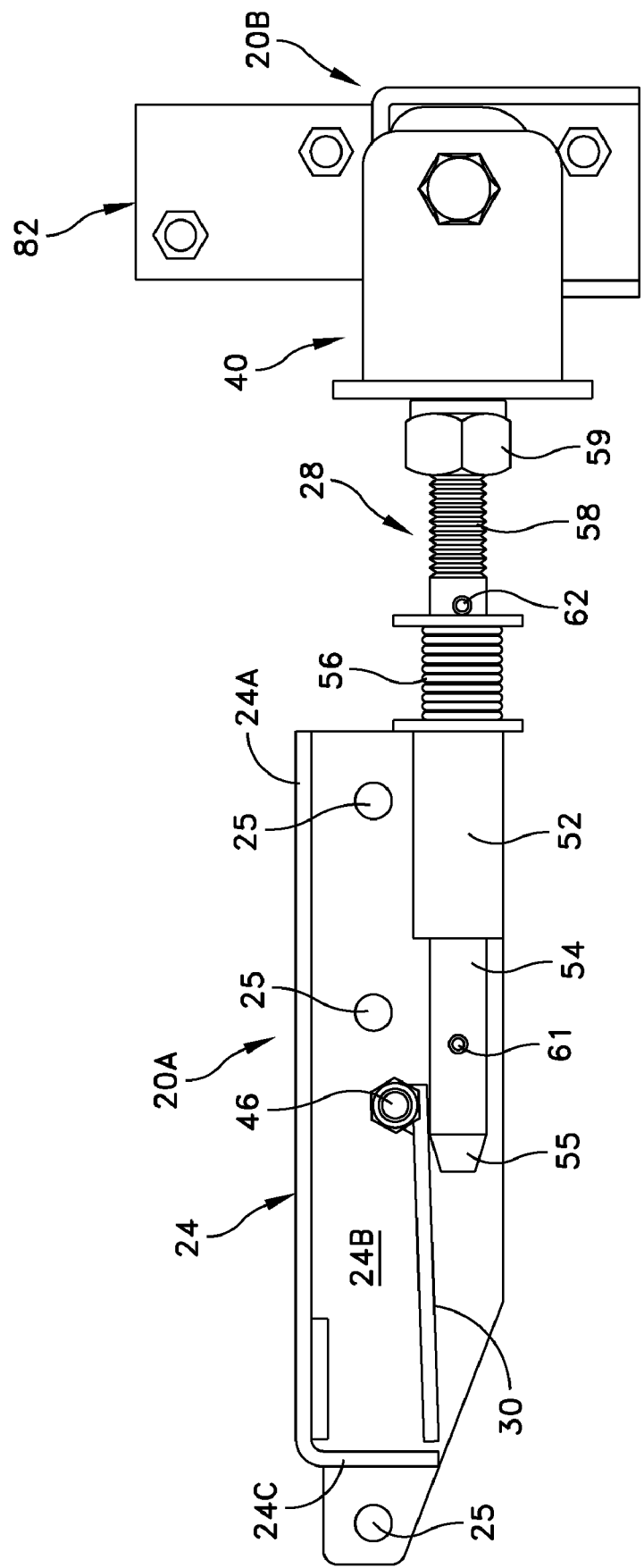
FIG. 10 is a side elevation view of the indicator mechanism of the present invention with the flag in its rest position corresponding to the tailgate being closed.
Figure 11:
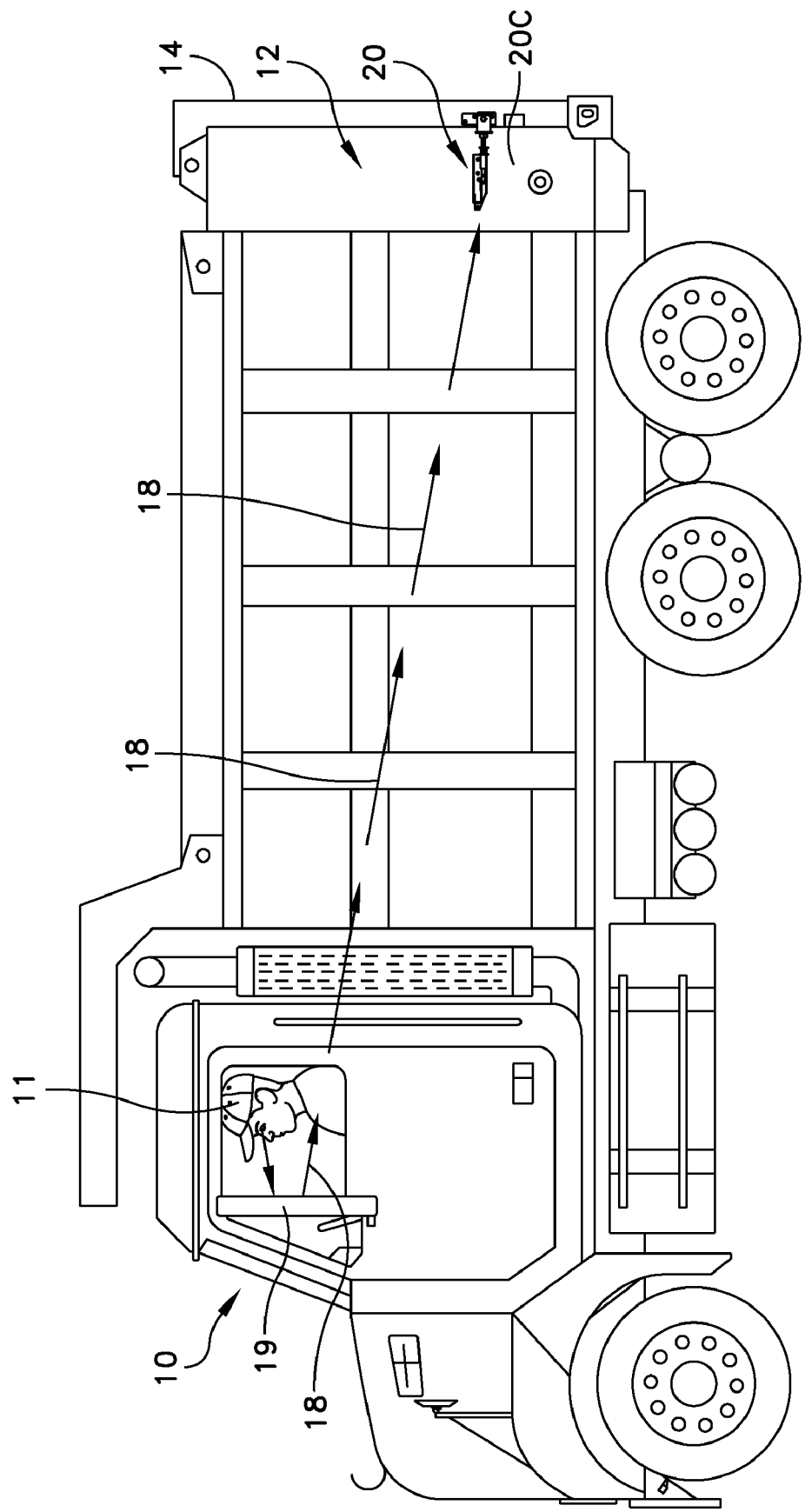
FIG. 11 is a side elevation view similar to the one shown in FIG. 1 and illustrating the line of sight by the operator or driver from the cab of the vehicle to the indicator device.
Figure 12:
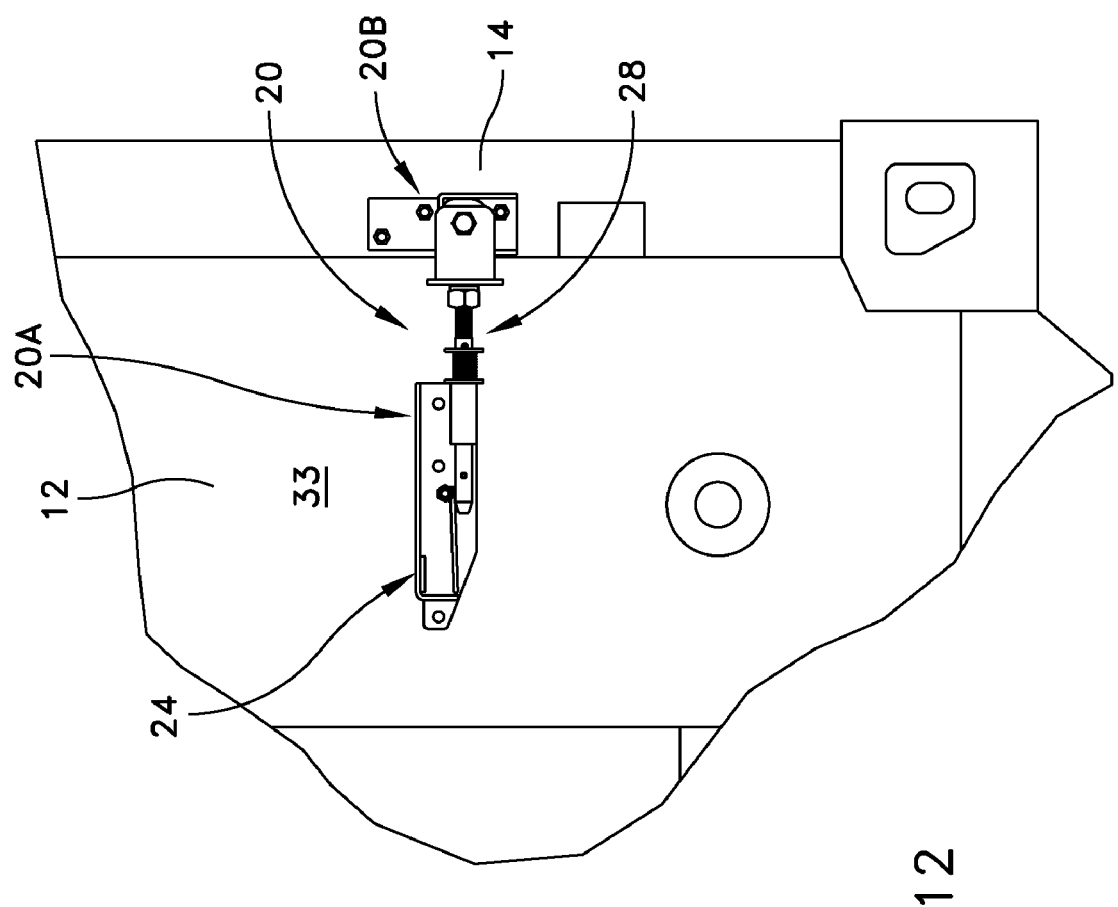
FIG. 12 is a fragmentary side elevation view illustrating the indicator device as attached to the vehicle and in its at rest position with the tailgate closed.
Figure 14:
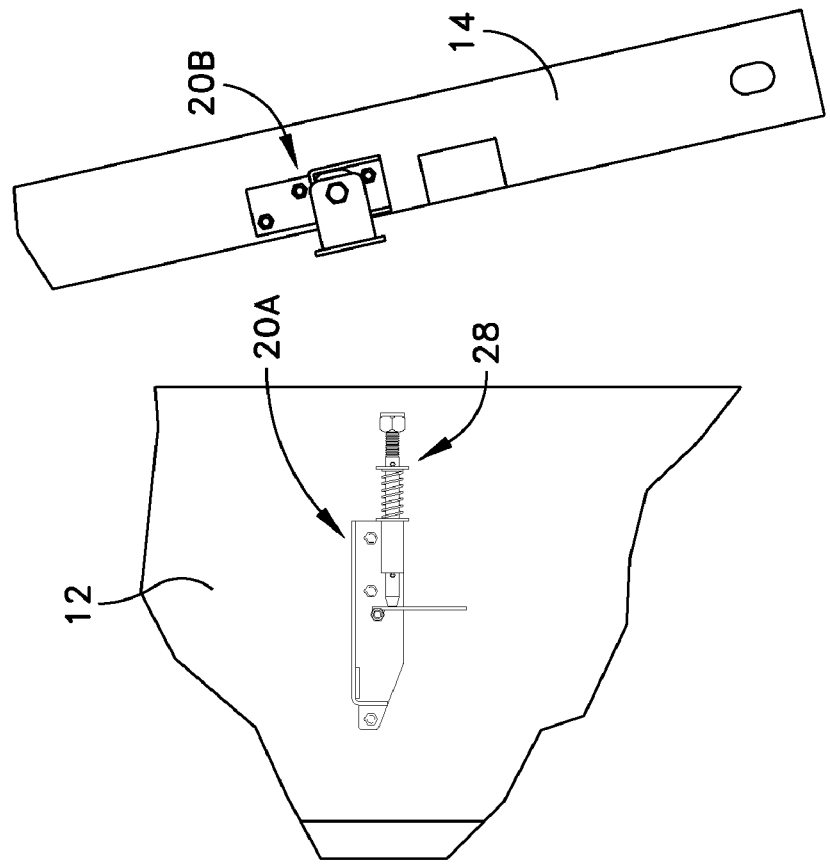
FIGS. 13 and 14 illustrate the position of the indicator mechanism when the tailgate is open showing the flag or door in its viewable position.
Figure 13:
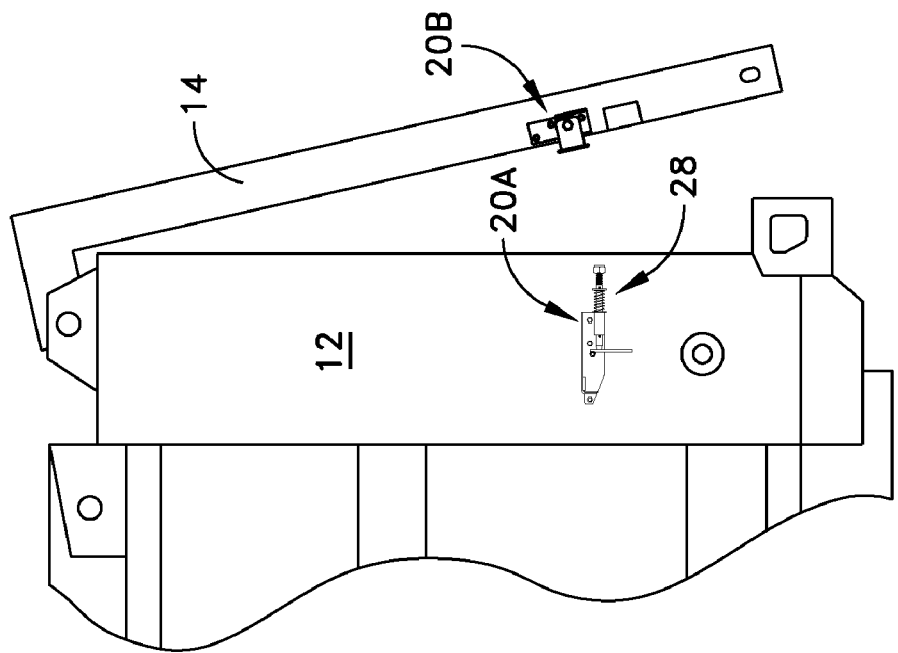
Figure 15:
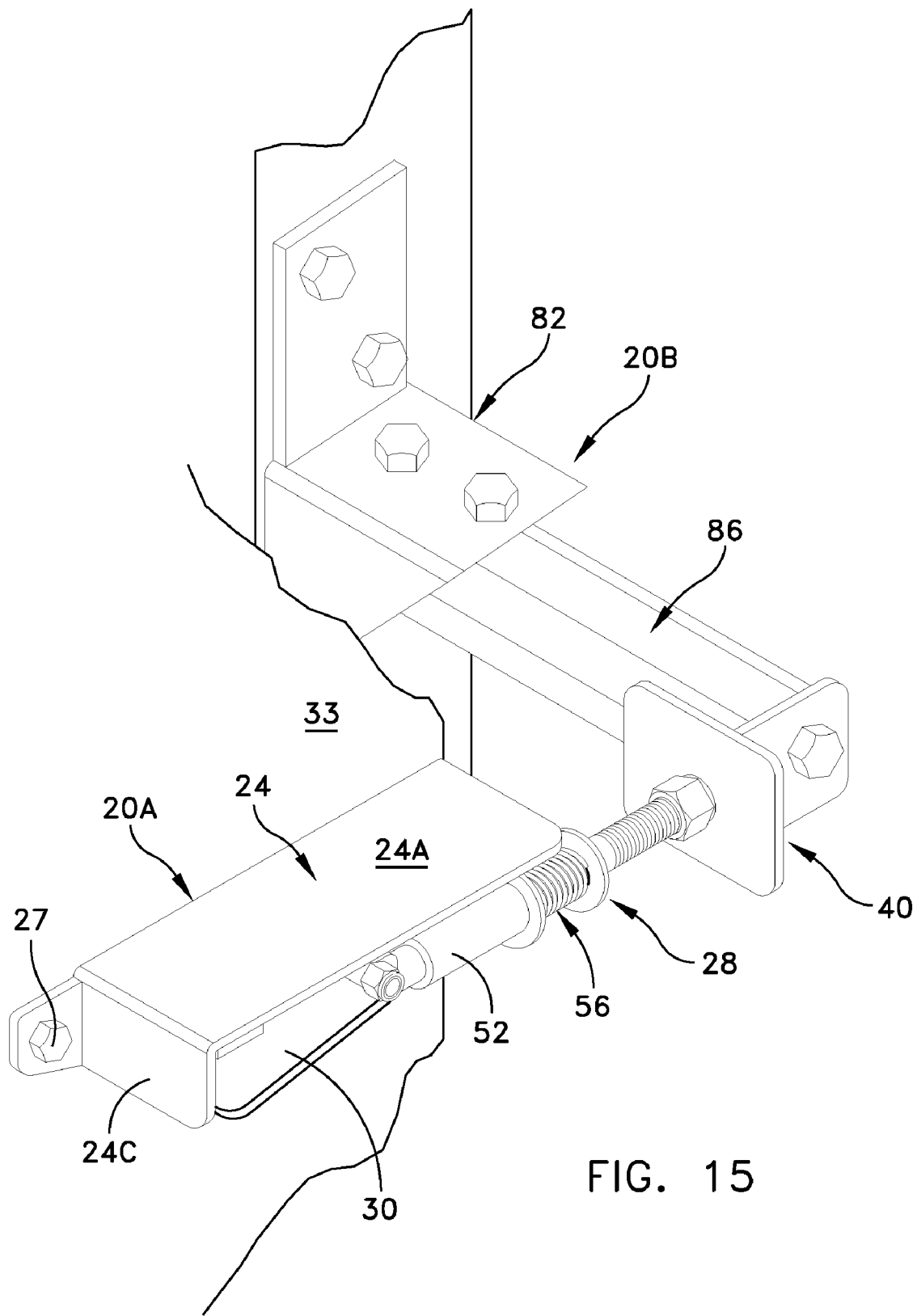
FIG. 15 is a perspective view illustrating the indicator mechanism of the present invention in its at rest position with the viewing flag or door out of view.

The visual indicator of the present invention is illustrated herein in FIGS. 1-15. To understand the use of the visual indicator of the present invention, reference may be made to a side elevation view of a typical vehicle such as a dump truck shown in FIGS. 1 and 11. In both of these side views, the tailgate 14 is shown in its closed position and the indicator 20 shows no visually observable flag or door. FIGS. 1 and 11 illustrate a truck cab 10, a truck body or bed 12 and a tailgate 14. The cab, bed and tailgate may be considered of conventional type. Usually, the bottom of the tailgate is locked by a locking mechanism (not shown) that may include a hook and pin. As indicated previously, many times stones or debris get caught in this locking mechanism and thus even though the operator of the vehicle may believe that the tailgate is properly closed, it may not be properly closed. The indicator of the present invention is adapted to detect even a slight opening of the tailgate and thus an unsecured position of the tailgate.

FIGS. 1 and 11 illustrate the indicator 20 of the present invention. This indicator may be considered as comprising a support mechanism including a first mechanism mounted to the bed and a second mechanism mounted to the tailgate. In FIG. 1, for example, the first mechanism is illustrated at 20A and the second mechanism is illustrated at 20B. FIG. 11 in particular illustrates by arrows at 18 the line of sight from the cab 10 of the vehicle via the rearview mirror 19 to the indicator 20. Thus, the driver 11 of the vehicle can determine by viewing in the rearview mirror 19 the condition of the indicator 20. A safe condition is indicated when no flag or door is observed. An unsafe condition is seen in the rearview mirror when any portion of the door or flag is observable. The flag or door is illustrated in the drawings at 30 and preferably has a bright painted surface 30A on the surface that faces forward when the flag is in its indicating position. A fluorescent paint may be applied to that surface. Also, a light may be mounted adjacent to the indicator 20 such as in the area illustrated at 20C in FIG. 11. Any such mounted light may be used to further assist in the lumination of the flag or door. The mounted light may be operated in conjunction with the normal marker lights used on vehicles of this type.

As indicated previously, the indicator of the present invention is comprised of a first mechanism 20A including a bed bracket that is secured to the bed of the truck and a tailgate bracket assembly that is secured to the tailgate of the truck. This first mechanism 20A illustrated throughout the drawings includes an angle bracket 24. The bracket 24 is generally of L-shape including legs 24A and 24B. The drawings also illustrate a turned end 24C that provides some additional structure to the bracket 24. The leg 24B is meant to be secured to the side 33 of the bed at a location close to the tailgate 14 such as in the position illustrated in FIG. 1. In order to secure the leg 24B, it is provided with three holes 25 as illustrated in, for example, FIG. 4. There are corresponding bolts 27 illustrated in FIG. 2 that may be used passing through each of the respective holes 25 for securing the bracket 24 to the bed of the truck. The bolts 27 may be self-tapping bolts or screws.

The observation door or flag 30 is supported by a pivot pin 46 that is attached to the leg 24B. The pivot pin 46 enables the flag 30 to be freely rotatable thereon. When the actuation pin 28 is not engaging the door then the door is free to pivot to a substantially vertical position which is considered to be an indicating position of the indicator device.

The drawings also illustrate the actuation pin mechanism 28 which is mounted by means of the collar 52 to the first mechanism 20A. More particularly, the collar 52 that supports the actuation pin mechanism 28 may be secured to either of the legs of the bracket 24. The actuation pin mechanism 28 includes a slide pin 54 that is adapted to be supported in the collar 52 and that transitions, such as from left to right in FIG. 4. The tip 55 of the slide pin 54 is mounted for contact with the door 30 such as illustrated in FIG. 4. FIG. 4 illustrates the indicating position of the door 30 where it is observable from the driving compartment. On the other hand, the view of FIG. 10 illustrates the tip 55 contacting the door 30 which indicates a rest position of the indicator, meaning that there is no door observed and thus the tailgate is in the proper locked position. The actuation pin mechanism 28 also includes coil spring 56 and stops 61 and 62. The stops 61 and 62 are illustrated in the drawings in the form of respective pins. The pin 61, as observed in FIG. 4, can limit the transition of the slide pin 54 to the right. The pin 62 and associated washer 63 capture one end of the spring 56.

In the position of the actuating pin shown in FIG. 4, this is where the tailgate has not yet engaged the bed of the truck. The coil spring 56 causes the slide pin 54 to move to the right. The stop pin 61 against collar 52 prevents any further rightward motion. In that position the tip 55 of the actuating pin 54 may be slightly in contact with the door 30 or slightly spaced from the door 30. This enables the door 30 to be substantially vertical in its orientation so that its surface 30A, as shown in FIG. 4, is readily viewed from the driving compartment along the line of sight 18. The surface 30A is preferably painted a fluorescent or reflective bright color so that it can be readily observed from the driving compartment of the vehicle. Also, as mentioned previously, a light may be mounted close to the location of the surface 30A so that some further illumination is provided in that area.

As indicated previously, the slide pin 54 is supported within the collar 52 and is adapted to slide therein such as between the respective positions illustrated in FIGS. 4 and 10. The collar 34 may be welded or attached in any other suitable manner preferably to the leg 24B of the bracket 24. The slide pin 54 also preferably includes a threaded end 58 that receives a nut 59. The nut 59 is preferably a lock nut. The threaded section 38 is provided in a sufficient length so that a portion of the threaded section may be cut off for the purpose of adjusting the position of the first mechanism 20A relative to the second mechanism 20B. The end of the actuating pin at the nut 59 is meant for engagement with the second mechanism 20B and in particular a bracket 40. In this regard, reference is made to FIG. 10 illustrating the end nut 59 in contact with the bracket 40. This is the position wherein the tailgate is properly closed and the pressure of the bracket 40 against the nut 59 moves the slide pin 54 to the left as viewed in FIG. 10 causing the door 30 to move to a substantially horizontal or non-indicating position.

Figure 2:
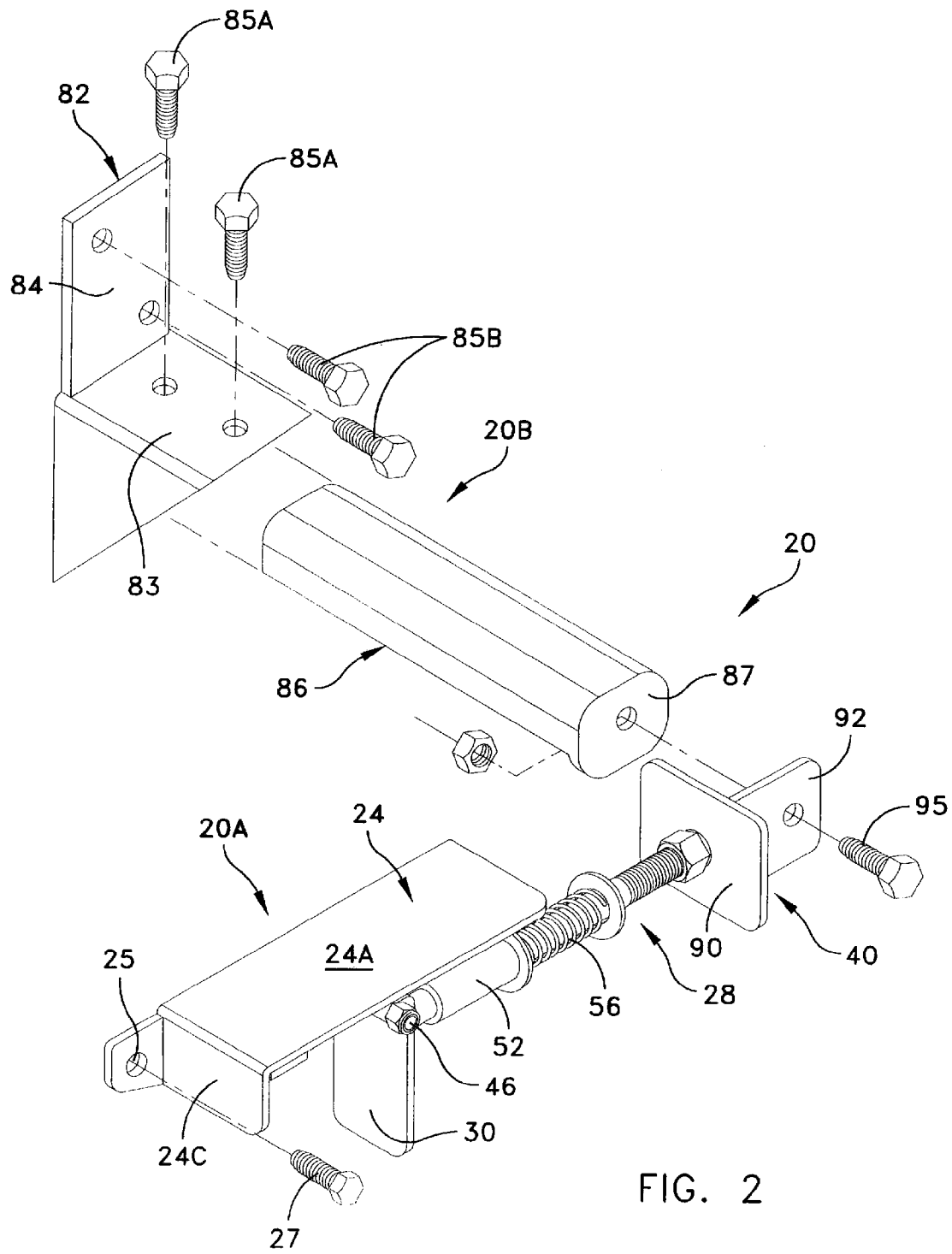
FIG. 2 is an exploded perspective view of the indicator mechanism of the present invention.
Figure 6:
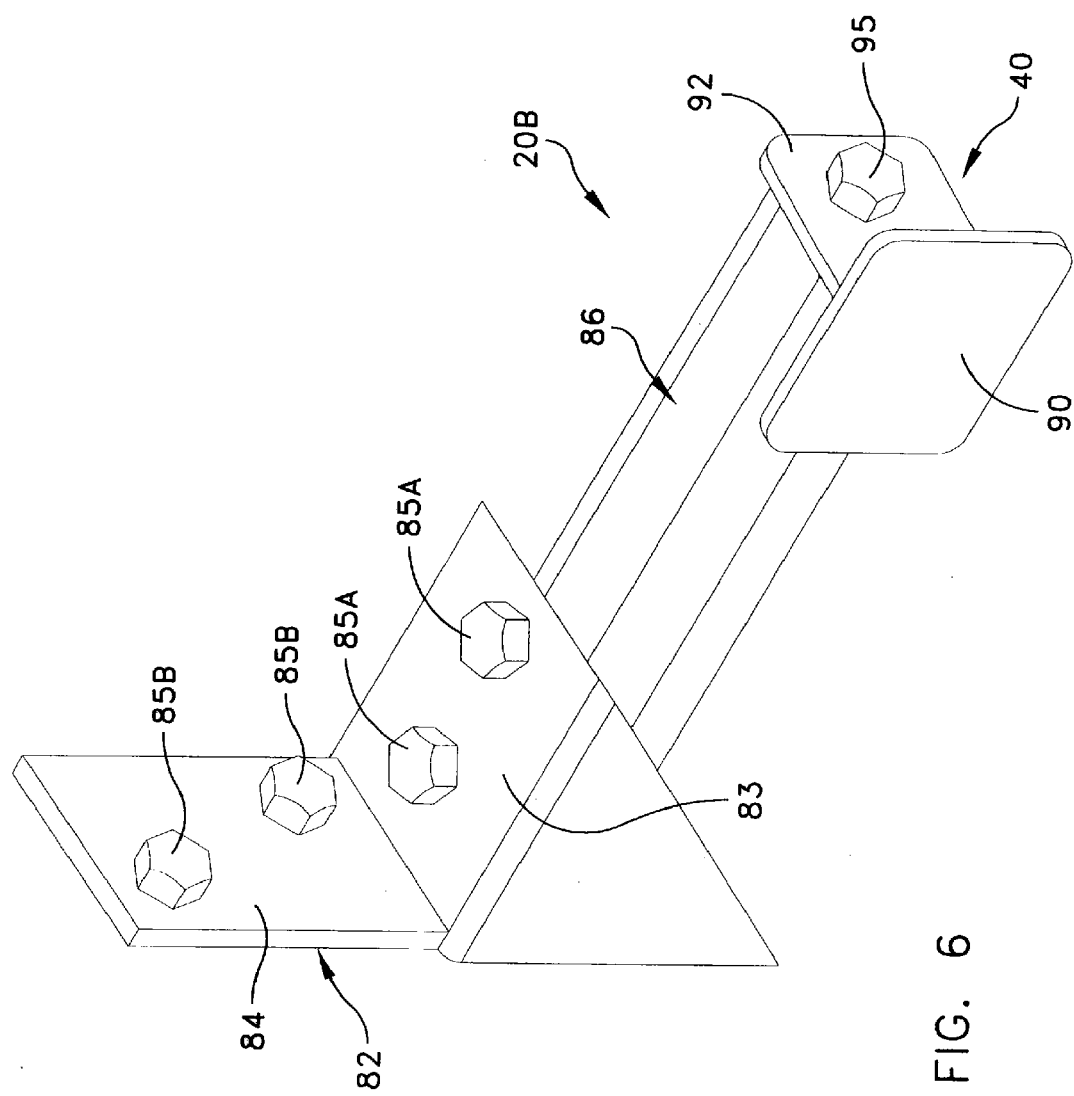
FIG. 6 is a perspective view of the part of the indicator mechanism that is attached to the tailgate including a bracket assembly.
Figure 8:
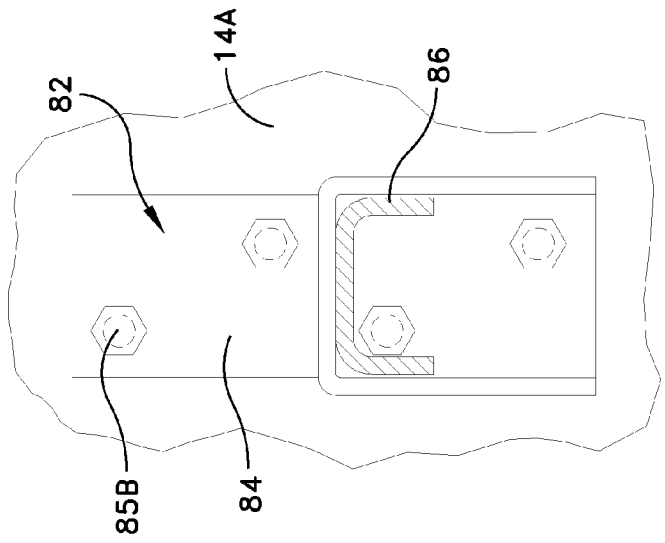
FIG. 8 is a cross-sectional view taken along line 8-8 of FIG. 7.
Figure 7:
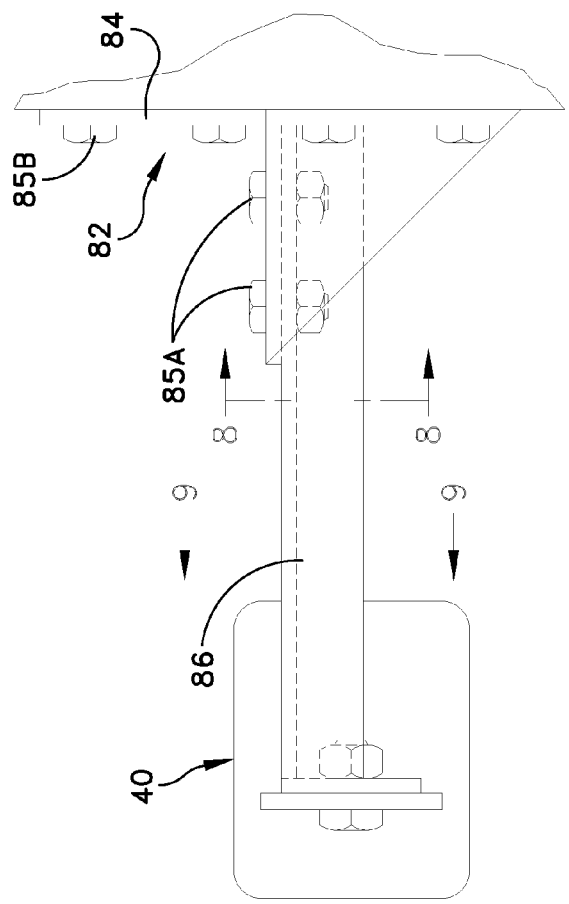
FIG. 7 is a side elevation view of the bracket assembly of FIG. 6 as attached to the tailgate.
Figure 9:
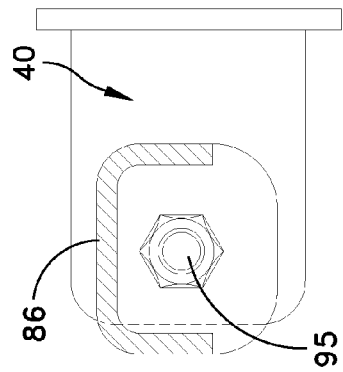
FIG. 9 is a cross-sectional view taken along line 9-9 of FIG. 7.

Reference is now also made to FIGS. 2 and 6-10 for further details of the second mechanism of the indicator device. This second mechanism 20B includes a bracket assembly that is preferably secured to a side of the tailgate at 14A in, for example, FIG. 8. This second mechanism includes, in addition to the bracket 40, the flange 82 and the spacer 86. The flange 82 is for attachment to the side of the tailgate. As shown in FIG. 2, the flange 82 includes a base 83 and a backwall 84. Both the base 83 and the backwall 84 are provided with holes for receiving respective bolts 85A and 85B. The bolts 85A and 85B are for securing the flange 82 to the side of the side 14A of the tailgate. The bolts 85A are used to secure the spacer to the underside of the base 83 of the flange 82.

The bracket 40 preferably includes two legs including a contact plate 90 and a leg 92. The spacer 86 is preferably provided with an end wall 87 that has a hole therethrough. The leg 92 has a similar sized hole. A bolt 95 or the like may pass through the holes in the leg 92 and in the end 87 for securing the spacer 86 to the bracket 40. This support by the bolt 95 also enables some relative pivoting of the bracket 40 so that there can be an adjustment depending upon the structure of the bed and tailgate. Also, the spacer 86 can be cut to different lengths and holes may be drilled at the left end as viewed in FIG. 2 of the spacer so as to accommodate the bolts 85A.

Thus, in accordance with the present invention there is provided a visual indicator device for use on a vehicle that includes a bed and a tailgate that engages with the bed and that may assume open and closed positions relative to the bed. The visual indicator device is for determining, from the cab of the vehicle via a rearview mirror, the status of the position of the tailgate by observing the position of the flag or door 30. In this regard, in for example, FIGS. 1, 10 and 11 the tailgate is properly closed. In that position the actuator pin 54 is moved to the left contacting the door 30 and pivoting the door upwardly to a substantially horizontal position. In that position, the driver of the vehicle notes that no flag is observed thus assuring the driver that the tailgate is properly locked in position.

If the tailgate is even slightly open, and this may occur even if the normal locking mechanism has been actuated, then the slide pin is in the position illustrated in FIG. 4. Because there is not any pressure on the slide pin at the right end thereof, the coil spring 56 maintains a slide pin in the position illustrated in FIG. 4. In that position the observable side 30A of the flag 30 is substantially vertical and thus the flag 30 is readily observable by the driver of the vehicle. This observation indicates to the driver that the tailgate is not completely closed and locked. Even if the tailgate is partially closed, it is possible that the door 30 may tilt slightly upwardly. However, there is still a portion of the observable surface 30A that can be viewed from the cab of the vehicle indicating to the operator that the tailgate is not properly locked in position.

One of the advantages of the visual indicator of the present invention is that it is relatively easy to use by the driver simply glancing in the rearview mirror to see whether the visible door surface 30A can be seen or not. Again, should the rear tailgate be even slightly open then the door 30 pivots downwardly slightly from its horizontal position and a small portion of the surface area 30A is observable by the driver to indicate that the tailgate is not sufficiently closed. As indicated previously, the surface 30A is preferably painted a bright fluorescent or reflective color so that it is readily observable even from several feet away at the driving compartment, and even if only a portion of the door surface 30A is observable. As also indicated previously, the door 30 is supported in a manner whereby, if there is no force against the door, under gravity it simply assumes a vertical position. The support pin for the door supports the door in a manner wherein it is readily pivotal and can thus be readily pivoted between the alternate positions as illustrated in the drawings herein.

The device of the present invention may also be provided with an electronic sensor switch for triggering an alarm, flash or buzzer in the cab of the vehicle. This sensor can be mounted adjacent to the flag and close in response to the flag being in its indicating position (vertical or partially vertical).

Having now described a limited number of embodiments of the present invention, it should now be apparent to those skilled in the art that numerous other embodiments and modifications thereof are contemplated as falling within the scope of the present invention. For example, various types of adjustments have been mentioned herein but other adjustments are possible. For example, in place of the nut 59, one may provide a bolt that threads into the section 58 for providing longitudinal length adjustment.

What is claimed is:

1. A visual indicator device for use on a vehicle that includes a bed and a tailgate that engages with the bed and that may assume open and closed positions relative to the bed, said visual indicator device for determining, from the cab of the vehicle via a rearview mirror, the status of the position of the tailgate, said visual indicator device comprising, a support mechanism including a first mechanism mounted to the bed and a second mechanism mounted to the tailgate, an actuation pin mechanism that intercouples the first and second mechanisms, and an indicator flag supported by the first mechanism and responsive to the position of the actuation pin mechanism so that the indicator flag has an indicating position when the tailgate is disengaged from the bed so that the actuation pin mechanism is out of engagement with the indicator flag, and has a rest position when the tailgate is engaged with the bed whereby the actuation pin mechanism is in engagement with the indicator flag and wherein the indicator flag is supported in a pivotal manner and assumes a substantially vertical position in the indicating position of the tailgate, and a substantially horizontal position in the rest position of the tailgate.

2. The visual indicator of claim 1 wherein the first mechanism includes an angle bracket having one leg with a surface on one side that is secured to the bed and a surface on an opposite side that supports the actuation pin mechanism.

3. The visual indicator of claim 2 wherein the second mechanism includes a bracket assembly that is secured to a side of the tailgate and that includes a contact plate that is for engagement by the actuation pin mechanism.

4. The visual indicator of claim 1 wherein the actuation pin mechanism includes a slide pin and a collar that is fixed in position at the first mechanism and slidably supports the slide pin.

5. The visual indicator of claim 1 wherein the indicator flag is pivotally supported, by means of a pivot pin, from a leg of the first mechanism so that the indicating position thereof is substantially vertical under gravity and the pivot pin extends in a direction substantially orthogonal to a longitudinal axis of the actuation pin mechanism.

6. A visual indicator device for use on a vehicle that includes a bed and a tailgate that engages with the bed and that may assume open and closed positions relative to the bed, said visual indicator device for determining, from the cab of the vehicle via a rearview mirror, the status of the position of the tailgate, said visual indicator device comprising, a support mechanism including a first mechanism mounted to the bed and a second mechanism mounted to the tailgate, an actuation pin mechanism that intercouples the first and second mechanisms, and an indicator flag supported by the first mechanism and responsive to the position of the actuation pin mechanism so that the indicator flag has an indicating position when the tailgate is disengaged from the bed so that the actuation pin mechanism is out of engagement with the indicator flag, and has a rest position when the tailgate is engaged with the bed whereby the actuation pin mechanism is in engagement with the indicator flag, wherein the first mechanism includes an angle bracket having a leg that is secured to the bed, wherein the second mechanism includes a bracket assembly that is secured to a side of the tailgate and that includes a contact plate that is for engagement by the actuation pin mechanism, and wherein the second mechanism further includes a flange that is attached to the side of the tailgate and a spacer that intercouples the flange and contact plate.

7. The visual indicator of claim 6 wherein the contact plate includes a contact plate portion and a support plate portion that is orthogonal to the contact plate portion, the support plate portion being attached to an end of the spacer and pivotally supported therefrom to enable adjustment of the position thereof.

8. A visual indicator device for use on a vehicle that includes a bed and a tailgate that engages with the bed and that may assume open and closed positions relative to the bed, said visual indicator device for determining, from the cab of the vehicle via a rearview mirror, the status of the position of the tailgate, said visual indicator device comprising, a support mechanism including a first mechanism mounted to the bed and a second mechanism mounted to the tailgate, an actuation pin mechanism that intercouples the first and second mechanisms, and an indicator flag supported by the first mechanism and responsive to the position of the actuation pin mechanism so that the indicator flag has an indicating position when the tailgate is disengaged from the bed so that the actuation pin mechanism is out of engagement with the indicator flag, and has a rest position when the tailgate is engaged with the bed whereby the actuation pin mechanism is in engagement with the indicator flag, wherein the second mechanism includes a bracket assembly that is secured to a side of the tailgate and that includes a contact plate that is for engagement by the actuation pin mechanism, and the actuation pin mechanism includes a slide pin and a collar that is fixed in position at the first mechanism and slidably supports the slide pin.

9. The visual indicator of claim 8 wherein the action pin mechanism further includes a coil spring disposed about the slide pin and a pair of stops for limiting the extended position of the slide pin, the coil spring for biasing the slide pin away from the collar.

10. A visual indicator device for use on a vehicle that includes a bed and a tailgate that engages with the bed and that may assume open and closed positions relative to the bed, said visual indicator device for determining, from the cab of the vehicle via a rearview mirror, the status of the position of the tailgate, said visual indicator device comprising, a support mechanism including a first mechanism mounted to the bed and a second mechanism mounted to the tailgate, an actuation pin mechanism that intercouples the first and second mechanisms, and an indicator flag supported by the first mechanism and responsive to the position of the actuation pin mechanism so that the indicator flag has an indicating position when the tailgate is disengaged from the bed so that the actuation pin mechanism is out of engagement with the indicator flag, and has a rest position when the tailgate is engaged with the bed whereby the actuation pin mechanism is in engagement with the indicator flag, wherein the indicator flat is pivotally supported from a leg of the first mechanism so that the indicating position thereof is substantially vertical under gravity, and wherein the actuation pin mechanism, when moved by contact with the second mechanism, moves to the rest position thereof whereby the indicator flag is substantially horizontal by contact of the actuation pin mechanism with the indicator flag.

11. The visual indicator of claim 1 wherein the indicator flag has a forward facing surface with a visual fluorescent area.

12. A visual indicator device for attachment between a truck bed and tailgate, and comprising:
   a bed bracket;
   means securing the bed bracket to the bed of the truck;
   a tailgate bracket assembly;
   means securing the tailgate bracket assembly to the tailgate of the truck;
   an actuation pin mechanism that intercouples the bed bracket and the tailgate bracket assembly;
   means for mounting the actuation pin mechanism to the bed bracket;
   and an indicator flag supported by the bed bracket and responsive to the position of a slide pin of the actuation pin mechanism so that the indicator flag has an indicating position when the tailgate is disengaged from the bed so that the actuation pin mechanism is out of engagement with the indicator flag, and has a rest position when the tailgate is engaged with the bed whereby the actuation pin mechanism is in engagement with the indicator flag;
   and wherein the indicator flag is supported in a pivotal manner and assumes a substantially vertical position in the indicating position of the tailgate, and a substantially horizontal position in the rest position of the tailgate.

13. The visual indicator of claim 12 wherein the tailgate can assume an open or closed position relative to the bed, and the device is viewable from the cab of the vehicle via a rearview mirror to determine the status of the position of the tailgate relative to the bed.

14. A visual indicator device for attachment between a truck bed and tailgate, and comprising:
   a bed bracket;
   means securing the bed bracket to the bed of the truck;
   a tailgate bracket assembly,
   means securing the tailgate bracket assembly to the tailgate of the truck;
   an actuation pin mechanism that intercouples the bed bracket and the tailgate bracket assembly;
   means for mounting the actuation pin mechanism to the bed bracket;
   and an indicator flag supported by the bed bracket and responsive to the position of a slide pin of the actuation pin mechanism so that the indicator flag has an indicating position when the tailgate is disengaged from the bed so that the actuation pin mechanism is out of engagement with the indicator flag, and has a rest position when the tailgate is engaged with the bed whereby the actuation pin mechanism is in engagement with the indicator flag;
   wherein the tailgate can assume an open or closed position relative to the bed, and the device is viewable from the cab of the vehicle via a rearview mirror to determine the status of the position of the tailgate relative to the bed;
   wherein the indicator flag, in the open position of the tailgate, is visual via the rearview mirror, and in the closed position thereof, is out of view in its rest position via the rearview mirror;
   wherein the indicator flag is supported in a pivotal manner and assumes a substantially vertical position in the open position of the tailgate, and a substantially horizontal position in the closed position of the tailgate.

15. A visual indicator device for attachment between a truck bed and tailgate, and comprising:
   a bed bracket;
   means securing the bed bracket to the bed of the truck;
   a tailgate bracket assembly;
   means securing the tailgate bracket assembly to the tailgate of the truck;
   an actuation pin mechanism that intercouples the bed bracket and the tailgate bracket assembly;
   means for mounting the actuation pin mechanism to the bed bracket:
   and an indicator flag supported by the bed bracket and responsive to the position of a slide pin of the actuation pin mechanism so that the indicator flag has an indicating position when the tailgate is disengaged from the bed so that the actuation pin mechanism is out of engagement with the indicator flag, and has a rest position when the tailgate is engaged with the bed whereby the actuation pin mechanism is in engagement with the indicator flag;
   wherein the tailgate can assume an open or closed position relative to the bed, and the device is viewable from the cab of the vehicle via a rearview mirror to determine the status of the position of the tailgate relative to the bed;
   wherein the indicator flag, in the open position of the tailgate, is visual via the rearview mirror, and in the closed position thereof, is out of view in its rest position via the rearview mirror;
   and wherein the actuation pin mechanism includes a slide pin, a collar that is fixed in position at the bed bracket and slidably supports the slide pin, and a biasing means that urges the slide pin away from the collar.

16. A method of operating an indicator device that is used on a vehicle that includes a bed and a tailgate that engages with the bed and that may assume open and closed positions of the tailgate relative to the bed, the method comprising determining, from the cab of the vehicle via a rearview mirror, the status of the open or closed position of the tailgate relative to the bed, said method further comprising providing a visual indicator flag that is mounted at the rear of the vehicle adjacent the interface between the bed and tailgate and that can assume an indicating position or a non-indicating position, causing the visual indicator device to move to the indicator position thereof when the tailgate is open, and alternatively causing the visual indicator device to move to the non-indicator position thereof when the tailgate is closed, and wherein the indicator flag is supported in a pivotal manner and assumes a substantially vertical position in the open position of the tailgate, and a substantially horizontal position in the closed position of the tailgate.

17. A method of operating an indicator device that is used on a vehicle that includes a bed and a tailgate that engages with the bed and that may assume open and closed positions of the tailgate relative to the bed, the method comprising determining, from the cab of the vehicle via a rearview mirror, the status of the open or closed position of the tailgate relative to the bed, said method further comprising providing a visual indicator flag that is mounted at the rear of the vehicle adjacent the interface between the bed and tailgate and that can assume an indicating position or a non-indicating position, causing the visual indicator device to move to the indicator position thereof when the tailgate is open, and alternatively causing the visual indicator device to move to the non-indicator position thereof when the tailgate is closed, wherein the indicator flag includes a visual surface of a size sufficient for viewing from the vehicle cab in the open position of the tailgate, and in the closed position thereof, is out of view in its rest position via the rearview mirror, and wherein the indicator flag is supported in a pivotal manner and assumes a substantially vertical position in the open position of the tailgate, a substantially horizontal position in the closed position of the tailgate.

18. A method of operating an indicator device that is used on a vehicle that includes a bed and a tailgate that engages with the bed and that may assume open and closed positions of the tailgate relative bed, the method comprising determining, from the cab of the vehicle via a rearview mirror, the status of the open or closed position of the tailgate relative to the bed, said method further comprising providing a visual indicator flag that is mounted at the rear of the vehicle adjacent the interface between the bed and tailgate and that can assume an indicating position or a non-indicating position, causing the visual indicator device to move to the indicator position thereof when the tailgate is open, and alternatively causing the visual indicator device to move to the non-indicator position thereof when the tailgate is closed, and wherein an actuation pin mechanism includes a slide pin, a collar that is fixed in position at the bed bracket and slidably supports the slide pin, and a biasing means that urges the slide pin away from the collar.

19. A visual indicator device for use on a truck that includes a bed and a tailgate that engages with the bed, the tailgate pivoted at a top side thereof, the tailgate having a closed position relative to the bed in which the tailgate is pivoted to close against a rear frame of the bed and an open position in which the tailgate is pivoted away from the bed, said visual indicator device for determining, from the cab of the vehicle via a rearview mirror, the secured or unsecured status of the position of the tailgate, said visual indicator device comprising, a support mechanism including a first mechanism mounted to the bed and a second mechanism mounted to the tailgate, an elongated actuation mechanism that intercouples the first and second mechanisms, said first mechanism comprising a first bracket and said second mechanism comprising a second bracket, and an indicator flag pivotally supported by the first bracket, including a planar flag member and responsive to the position of the elongated actuation mechanism, the indicator flag having an unsecured status indicating position when the tailgate is in an at least partially open position, the indicator flag assuming a secured status closed position when the tailgate is engaged with the bed, the elongated actuation mechanism carried by a lower portion of the tailgate so as to pivot therewith to control the position of the indicator flag, the elongated actuation mechanism comprising an elongated actuation pin that is selectively in engagement with the planar flag member to control the position thereof, and the elongated actuation pin translating in a direction that is substantially transverse to the plane of the planar flag member when contact is made therewith.

20. The visual indicator of claim 19 wherein the indicator flag assumes a substantially vertical position in the indicating position, and a substantially horizontal position in the closed position.

21. The visual indicator of claim 19 including a collar fixed to the first bracket for supporting the actuation pin for translation therethrough.

22. The visual indicator of claim 21 wherein the elongated actuation pin has one end that is contacted by a contact plate on the second bracket.

23. The visual indicator of claim 19 wherein the elongated actuation pin extends in a direction that is substantially the same as the line of sight from the rearview mirror to the visual indicator.

* * * * *